US012639428B2

(12) United States Patent
Asokan et al.

(10) Patent No.: US 12,639,428 B2
(45) Date of Patent: May 26, 2026

(54) DEVELOPING FORENSIC PROJECTIONS FOR DATA VOLUMES USING SNAPSHOTS

(71) Applicant: NetApp, Inc., San Jose, CA (US)

(72) Inventors: Jagannathan Asokan, Karnataka (IN); Suraj Ashok Doddannavar, Karnataka (IN); Sridevi Tallapragada, Karnataka (IN)

(73) Assignee: NetApp, Inc., San Jose, CA (US)

( * ) Notice: Subject to any disclaimer, the term of this patent is extended or adjusted under 35 U.S.C. 154(b) by 50 days.

(21) Appl. No.: 18/760,612

(22) Filed: Jul. 1, 2024

(65) Prior Publication Data

US 2026/0003957 A1     Jan. 1, 2026

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| 7,756,834 | B2 * | 7/2010 | Masters | ................ | G06F 21/568 |
| | | | | | 707/674 |
| 9,143,523 | B2 * | 9/2015 | Evrard | ................ | H04L 63/1433 |
| 11,030,314 | B2 * | 6/2021 | Kucherov | ............... | G06F 3/067 |
| 11,483,325 | B2 * | 10/2022 | Monsen | .............. | H04L 63/1458 |
| 12,399,993 | B2 * | 8/2025 | Gee | ......................... | G06F 21/53 |
| 2016/0112445 | A1 * | 4/2016 | Abramowitz | .......... | G06Q 40/08 |
| | | | | | 726/23 |
| 2018/0039922 | A1 * | 2/2018 | King-Wilson | ...... | H04L 63/0263 |
| 2020/0159926 | A1 * | 5/2020 | Lorch | ................. | H04L 63/1425 |
| 2020/0314137 | A1 * | 10/2020 | Tsitkin | ................ | H04L 63/1433 |
| 2021/0044603 | A1 * | 2/2021 | Annen | ................ | H04L 63/1416 |
| 2022/0092180 | A1 * | 3/2022 | Richardson | ........... | G06F 11/108 |
| 2022/0138169 | A1 * | 5/2022 | Yelheri | ................. | G06F 16/182 |
| | | | | | 707/695 |
| 2023/0362194 | A1 * | 11/2023 | Lai | ........................ | H04L 63/1491 |
| 2024/0160728 | A1 * | 5/2024 | Flynn | ..................... | G06F 21/554 |
| 2024/0378321 | A1 * | 11/2024 | Nunez Mencias | .... | G06F 16/128 |

FOREIGN PATENT DOCUMENTS

| EP | 2999186 A1 * | 3/2016 | ......... H04L 63/0272 |
| WO | WO-2009083036 A1 * | 7/2009 | ......... H04L 63/1433 |

* cited by examiner

*Primary Examiner* — Christopher A Revak

(57) ABSTRACT

The disclosure describes a system for developing a forensic projection for data lost in a cyberattack. After identifying a cyberattack causing a loss of data in the data volume, the system identifies a snapshot of the portion of the data volume affected by the cyberattack. The system estimates, based on the snapshot, an amount of lost data caused by the cyberattack. The system then determines based at least on the amount of lost data, a data loss metric.

17 Claims, 9 Drawing Sheets

400

START

IDENTIFY CYBERATTACK    401

CREATE SNAPSHOT DUPLICATE    403

RECEIVE PROJECTION REQUEST    405

IDENTIFY DATA CLASSIFICATION    407

ESTIMATE AMOUNT OF LOST DATA    409

IDENTIFY DATA CRITICALITY VALUE    411

IDENTIFY DATA SENSITIVITY LEVEL    413

*for i = 1 to n*

DETERMINE DATA LOSS METRIC    415

UTILIZE DATA LOSS METRIC    417

END

500

600

START

RECEIVE PREMIUM CALCULATION REQUEST  601

IDENTIFY DATA CRITICALITY VALUE  603

IDENTIFY CLASSIFICATION OF DATA  605

IDENTIFY DATA SENSITIVITY VALUE  607

CALCULATE PREMIUM  609

END

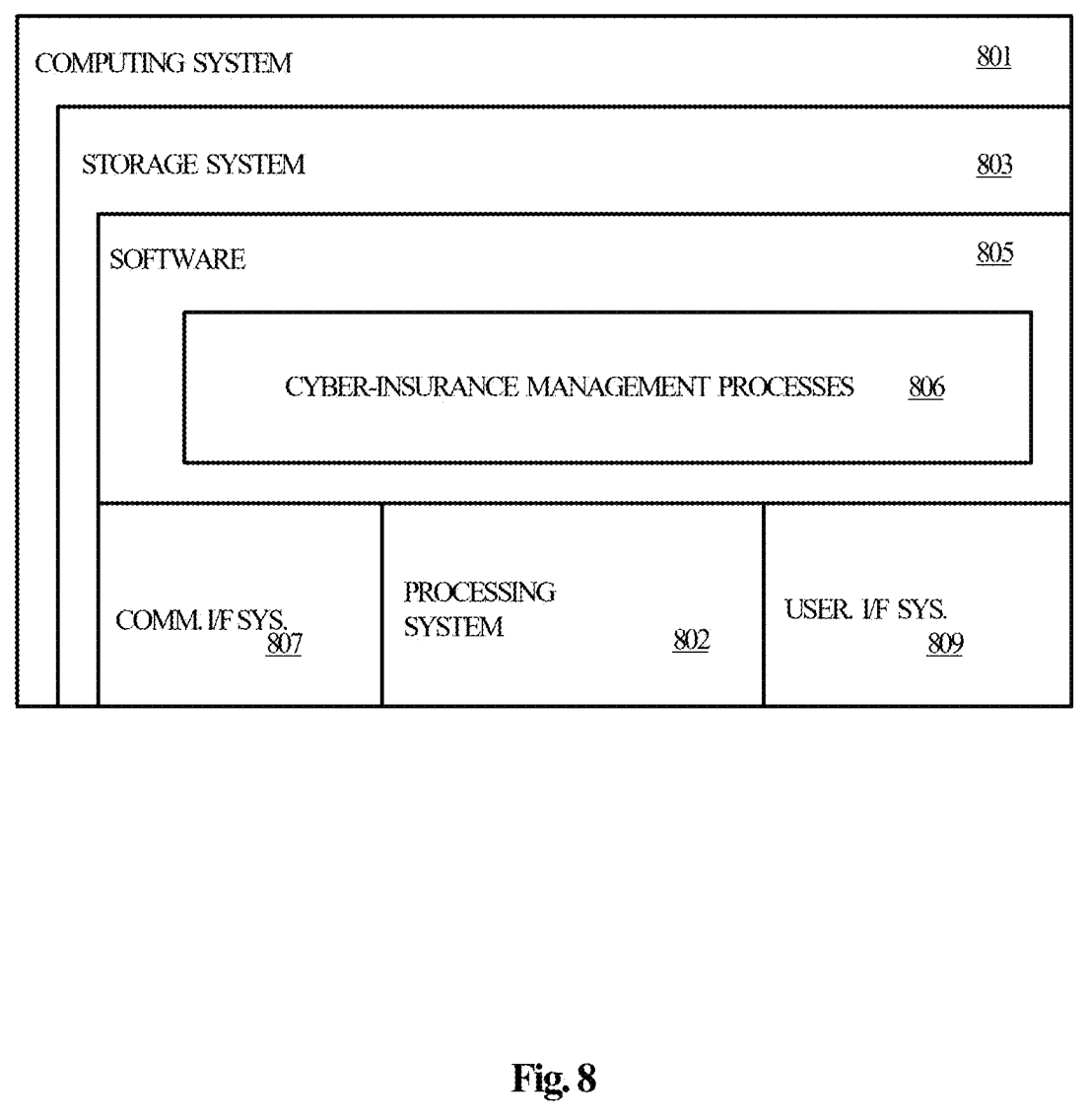

COMPUTING SYSTEM 801

STORAGE SYSTEM 803

SOFTWARE 805

CYBER-INSURANCE MANAGEMENT PROCESSES 806

COMM. I/F SYS. 807

PROCESSING SYSTEM 802

USER I/F SYS. 809

Fig. 8

DEVELOPING FORENSIC PROJECTIONS FOR DATA VOLUMES USING SNAPSHOTS

BACKGROUND

Enterprises managing vast volumes of data are increasingly vulnerable to cyberattacks, particularly ransomware, which can cause significant operational disruptions and financial losses. Organizations mitigate the effects of data losses caused by such attacks through various means, such as filing cyber-insurance claims and implementing refined data protection strategies. Mitigation strategies often involve assessing the extent of the resulting data losses; however, this process faces significant challenges.

One challenge is accurately quantifying the amount of data lost during a cyber incident. When data is compromised or lost due to a cyberattack, determining the extent of the loss becomes critical. Existing systems lack accurate and effective means to assess the extent of data loss when they no longer have access to the data, making it difficult for organizations to accurately assess the impact of such incidents. Furthermore, data varies widely in terms of its importance and sensitivity, complicating the standardization of its valuation. For example, customer databases, intellectual property, financial records, and personal information each possess different levels of intrinsic value and potential impact on a business. The lack of a consistent and reliable method to quantify the value of these diverse data sets complicates processes such as determining appropriate insurance claim amounts, calculating regulatory fines, developing new data protection strategies, and assessing business impacts.

SUMMARY

The technology described herein includes a system that develops forensic projections for lost data based on snapshots of data volumes. The system identifies a snapshot of a portion of a data volume affected by a cyberattack. The snapshot includes information indicative of changes made to the portion of the data volume between the snapshot and the cyberattack. The system determines a forensic projection associated with the portion of the data volume based on the information of the snapshot. The system determines a data loss metric based on the forensic projection. The system thus alleviates the above-described issues by developing forensic projections using snapshots.

These and other features and aspects of various examples may be understood in view of the following detailed discussion and accompanying drawings.

BRIEF DESCRIPTION OF THE DRAWINGS

FIG. 8 illustrates a computing system suitable for implementing the various operational environments, architectures, environments, processes, scenarios, sequences, and frameworks discussed below with respect to the other Figures.

DETAILED DESCRIPTION

Figure 1:
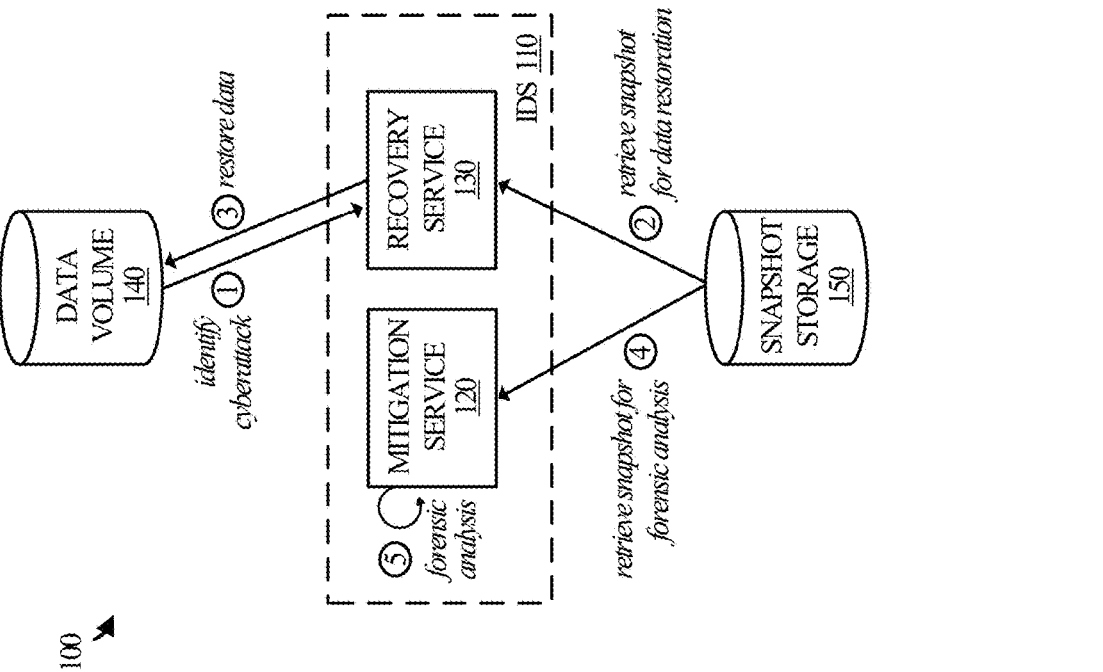
FIG. 1 illustrates a data environment in an implementation.

Developing strategies to mitigate the impact of data loss due to cyberattacks has become increasingly important for enterprises. Events such as ransomware attacks, malware, and data breaches can severely disrupt operations and result in significant data loss. Ransomware attacks, for example, encrypt a victim's data, making it inaccessible until a ransom is paid, and may cause permanent data loss if decryption efforts fail. Similarly, data breaches involve unauthorized access to sensitive information, leading to the theft or destruction of critical data like customer records and proprietary business information. To combat mitigate these threats, enterprises are adopting a range of measures, including cyber insurance, to ensure financial protection and resilience against cyber incidents.

A significant challenge faced by enterprises is the accurate valuation of lost data. Data varies widely in terms of its importance and sensitivity, complicating the standardization of its valuation. Furthermore, quantifying the data lost becomes difficult when access to the data is restricted or entirely lost due to the cyberattack, leaving businesses without a clear record of how much data has been affected.

The disclosure describes a system for calculating the value of data lost in a cyberattack based on data snapshots. Data snapshots are captures of a system's data at specific points in time, which may be taken periodically (e.g., every 5 minutes) or on request. These snapshots provide a reliable reference to determine the state of the data before a cyberattack occurs. Although data can be restored using the snapshots, a certain amount of data created or modified between the snapshot and the cyberattack is inevitably lost. For example, if a cyberattack occurs at 9:33 PM and the last snapshot was taken at 9:30 PM, three minutes of data is lost. The system described herein utilizes the snapshots to quantify the amount of data lost in this interim period. The system uses the estimated amount of lost data along with other identified parameters (e.g., sensitivity, criticality, and classification) to determine data loss metrics. These metrics provide a comprehensive understanding of the impact of a cyberattack, enabling enterprises to make informed decisions and take appropriate actions.

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of a data snapshot; 2) non-routine and unconventional operations for developing forensic projections for lost data; and/or 3) non-routine and unconventional use of snapshot storage.

In particular, the advantages of the technology disclosed herein include methods for determining the amount of data lost and assessing the criticality and sensitivity of the data lost in a data loss event. For an organization, the proposed solution quantifies the amount of data lost by data classification which in turn can be used to identify what data has been lost or stolen and to provide a basis for quantifying the value of the data that has been lost. Ultimately, the systems and methods disclosed herein can aid insurers in assessing the extent of data exposure and the appropriate cost of insurance premium as well as determining an accurate compensation that needs to be paid in the event of a data breach. Other aspects of the technology provide for archiving evidence of a data breach as evidence for analysis, remediation, and/or litigation.

FIG. 1 illustrates data environment 100 for developing forensic projections in an implementation. Data environment 100 includes integrated data services (IDS) 110, data volume 140, and snapshot storage 150.

Integrated data services 110 includes recovery service 130 and mitigation service 120, which are representative of any hardware, software, and/or firmware components capable of providing the data services described herein. Recovery service 130 is a service for recovering lost data (e.g., due to a cyberattack) in data volume 140. Mitigation service 120 is a service for mitigating the effects of cyberattacks. Integrated data services 110 may be implemented, for example, in a data infrastructure service such as data infrastructure service 305 of FIG. 3.

Data volume 140 represents an aggregation of data collected and stored for an enterprise system. Snapshot storage 150 serves as a data repository for storing snapshots of data volume 140. The data in both data volume 140 and snapshot storage 150 can be stored either in cloud storage or on-premises, depending on the specific implementation. The enterprise that owns the data can choose to distribute the storage locations of data volume 140 and snapshot storage 150 to enhance data protection. For instance, the enterprise may use different cloud providers for data volume 140 and snapshot storage 150, or it may use a cloud provider for one and on-premises storage for the other, depending on their data protection strategy and requirements.

A process flow for developing forensic projections is represented by steps 1 through 5 in FIG. 1 in an implementation. To begin, recovery service 130 identifies a cyberattack affecting data volume 140 (step 1). Next, recovery service 130 retrieves a data snapshot from snapshot storage 150 (step 2). Recovery service 130 restores the data in data volume 140 using the retrieved snapshot (step 3). Mitigation service 120 retrieves the data snapshot from snapshot storage 150 (step 4). Mitigation service 120 develops a forensic projection lost data based on the snapshot (step 5). The forensic projection may include, for example, an amount of data that was lost due to the cyberattack. It is noted that mitigation service 120 may retrieve the data snapshot in response to recovery service 130 identifying the cyberattack in step 1. Accordingly, steps 4 and 5 may be performed in parallel with steps 2 and 3 in some implementations.

The dual usage of snapshots for both data recovery and forensic projections allows for a seamless integration of mitigation functionalities into existing data management systems. This integration ensures that enterprises can efficiently manage and recover from cyberattacks while simultaneously assessing the scope of lost data (e.g., in order to build an insurance claim).

Figure 2:
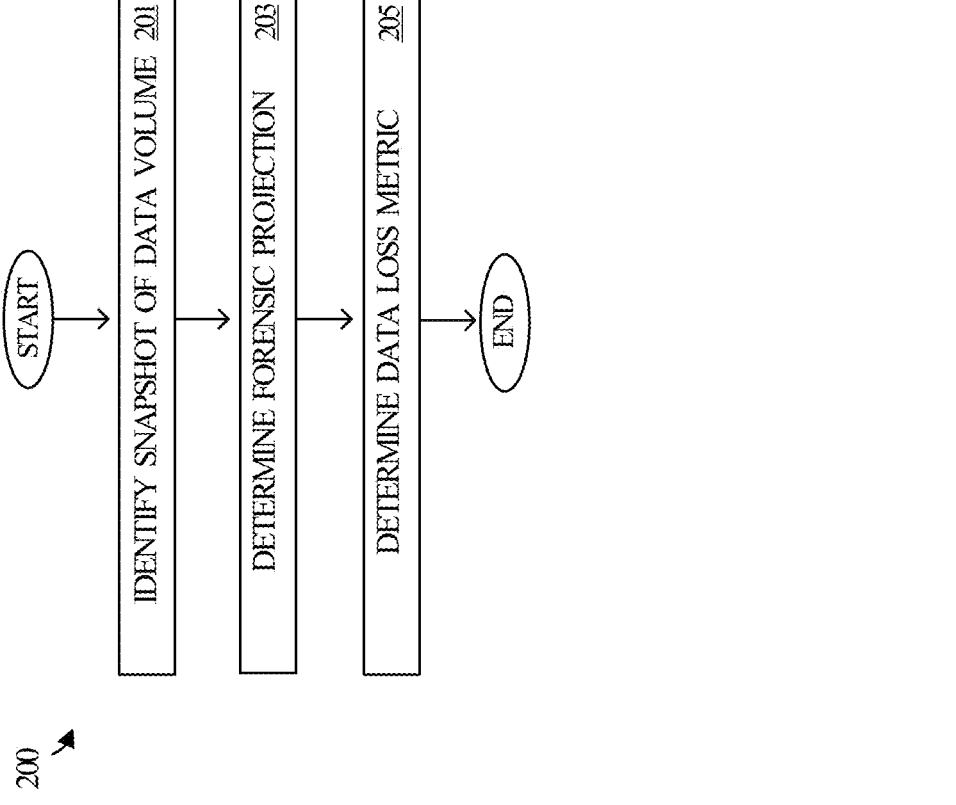
FIG. 2 illustrates a data forensics process in an implementation.

FIG. 2 illustrates a process for developing forensic projections, performed by integrated data services 110 (and more specifically by mitigation service 120), represented by process 200. Process 200 is employed by a computing device, an example of which is provided by computing system 801 of FIG. 8. Process 200 may be implemented in program instructions (software and/or firmware) by one or more processors of the computing device. The program instructions direct the computing device to operate as follows, referring parenthetically to the steps in FIG. 2.

In process 200, mitigation service 120 identifies a snapshot of a portion of data volume 140 affected by a cyberattack (step 201). In an implementation, data volume 140 containing client data (e.g., data relating to the business operations of a client) undergoes a cyberattack, such as a ransomware or other type of malware attack. In the event of a cyberattack on data volume 140, a snapshot is recovered from snapshot storage 150 to assess the extent of the damage caused by the attack and to restore data and resume business operations. In some implementations, to identify the extent of data volume 140 which is to be restored, the contents may be evaluated by a malware or ransomware detection system using entropy measurements to detect malicious encryption. In some scenarios, ransomware may have infected one or more of the most recent snapshots before the attack was detected. In these situations, multiple snapshots may be identified for the various portions of the infected data depending on when those portions were infected.

Having identified the snapshot, mitigation service 120 determines a forensic projection associated with the affected portion of data volume 140 (step 203). The forensic projection may include an amount of data lost due to the cyberattack in some implementations. For example, the forensic projection may include a number of data blocks or gigabytes of data of data volume 140 which have been modified by the cyberattack. The forensic projection may also include a more granular analysis of the data loss, such as including information about the classification, criticality, and sensitivity of the lost data. The forensic projection may also include information relating to read/write activity since the last coherent snapshot of the lost data.

Next, mitigation service 120 determines a data loss metric based on the forensic projection (step 205). The data loss metric may include, for example, the cost of the lost data which an enterprise may utilize for various purposes (e.g., for building cyber-insurance claims or regulatory reporting). In various implementations, to determine the cost of the lost data, a valuation or weighting may be applied to the amount of data lost according to the classification, criticality, and/or sensitivity of the data or other information from the forensic projection. For example, personally identifiable information (PII) data deemed more critical to business operations of the client may be of greater value than, say, data relating to customer search preferences. A total cost metric may then be determined by aggregating the valuations of data apportioned according to classification, criticality, and/or sensitivity. In some scenarios, the data loss metric may be computing based on submitting data of the forensic projection to an artificial neural network model trained to generate a data loss metric, e.g., a cost or valuation of the loss, based on the input data in accordance with its training.

Figure 3:
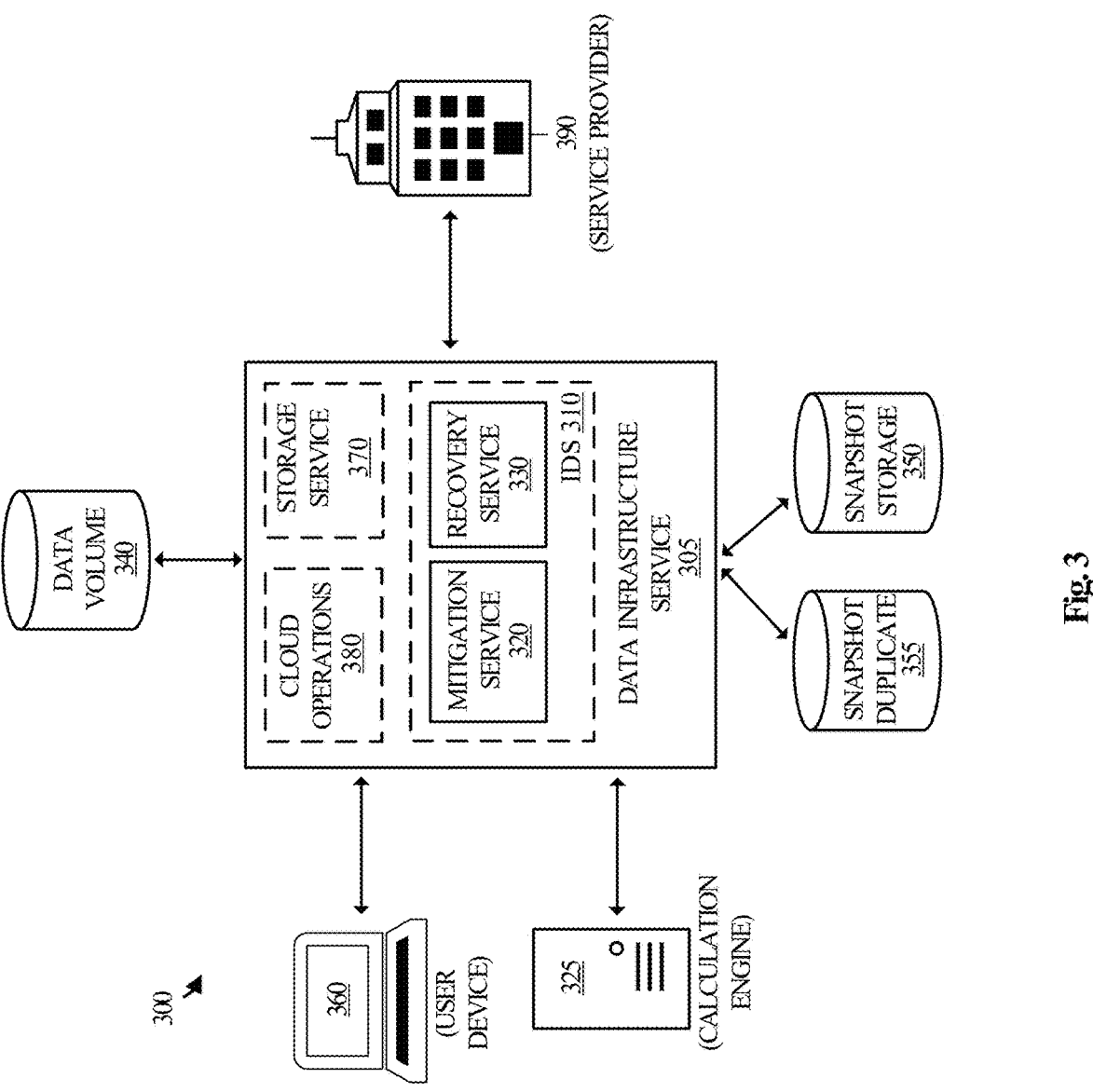
FIG. 3 illustrates another data environment in an implementation.

FIG. 3 illustrates data environment 300 in an implementation. Data environment 300 includes data infrastructure service 305, data volume 340, snapshot storage 350, snapshot duplicate 355, user device 360, calculation engine 325, and service provider 390. Data infrastructure service 305 includes integrated data services 310, cloud operations 380, and storage service 370.

Data volume 340 represents an aggregation of data collected and stored for an enterprise system. Snapshot storage 350 serves as a data repository for storing snapshots of data volume 340. The data in both data volume 340 and snapshot storage 350 can be stored either in cloud storage or on-premises, depending on the specific implementation. The enterprise that owns the data can choose to distribute the storage locations of data volume 340 and snapshot storage 350 to enhance data protection. For instance, the enterprise may use different cloud providers for data volume 340 and snapshot storage 350, or it may use a cloud provider for one and on-premises storage for the other, depending on their data protection strategy and requirements. Additionally, in the event of a cyberattack, snapshot duplicate 355 may be created and stored in a separate data store specifically for use by mitigation service 320. This ensures that a preserved copy of the snapshot is available for accurate assessment and claim processing, even if snapshot storage 350 undergoes changes.

Data infrastructure service 305 is representative of a software service that provides unified storage solutions for enterprise systems. Data infrastructure service 305 includes integrated data services 310, storage service 370 and cloud operations 380, which are representative of any hardware, software, and/or firmware components capable of providing the data services described herein.

Storage service 370 is a service that manages the storage of data, including data volume 340, for enterprise systems. Data volume 340 may be stored in servers (represented, for example, by computing system 801 of FIG. 8) and may be located on premises (i.e., operated by enterprise systems) or on the cloud. Snapshot duplicate 355 a separately stored duplicate of one or more snapshots, created by mitigation service 320 in response to a cyberattack, as explained further in process 400 below.

Cloud operations 380 is representative of services that optimize data management in cloud environments. Cloud operations 380 may include, for example, a service for integrating multi-cloud environments, a tiering service for optimizing the cost of storage, and a service for providing data insights.

Integrated data services 310 is representative of a collection of integrated services for managing substantial amounts of data. Integrated data services 310 includes mitigation service 320 and recovery service 330, which are described in detail below. Integrated data services 310 may additionally include services for classifying data, services for scaling applications and data on the cloud, services for unifying cloud and on-premises data storage, and services for facilitating an efficient utilization of storage resources.

Recovery service 330 is representative of a software service that provides disaster recovery for loss of data. This service involves storing snapshots of data volume 340 in snapshot storage 350. These snapshots may be taken periodically or on request, ensuring that the most recent state of the data is captured and available for recovery.

Recovery service 330 also includes mechanisms for identifying cyberattacks (e.g., ransomware attacks encrypting data in data volume 340) that compromise data integrity or availability. When such an attack is detected, recovery service 330 can quickly restore data volume 340 using the latest snapshot. Although the restoration process reduces data loss, a certain amount of data is often lost between the time the most recent snapshot and the cyberattack. In such cases, enterprises may recover the value of the lost data by submitting cyber-insurance claims.

Mitigation service 320 is representative of a software service that aids enterprises in mitigating the effects of cyberattacks. Mitigation service 320 determines data loss metrics based on snapshots, as discussed further in process 400 below. In some implementations, mitigation service 320 provides an interface for building and submitting insurance claims for lost data. A user (e.g., on user device 360) may interact with mitigation service 320 via a user interface, such as user interface 700 shown in FIGS. 7A and 7B.

Mitigation service 320 is configured to utilize data snapshots in snapshot storage 350 to calculate the data loss metrics (e.g., the cost of the lost data). As noted above, while data snapshots may restore a portion of data lost in a cyberattack, a certain amount of data is lost in the time period between the snapshot and a cyberattack. For example, enterprise systems may configure their storage services to take data snapshots periodically (e.g., every 30 seconds, every minute, every five minutes, every hour, etc.). If data volume 340 is subject to a cyberattack three minutes after the most recent snapshot, three minutes' worth of data is not recoverable using the snapshot. For large enterprise systems that continuously add or modify data in data volume 340, a substantial amount of data may be lost in this period. Mitigation service 320 may estimate this amount of lost data using a snapshot retrieved from snapshot storage 350.

Mitigation service 320 may utilize assorted techniques to estimate the amount of lost data in various implementations. For example, mitigation service 320 may calculated an average amount of data added or modified in data volume 340 over time, by examining the time stamps of modifications in the most recent snapshot, or by comparing multiple successive snapshots (as explained further in the description of process 400 below). In other implementations, and specifically in the case of a ransomware attack, mitigation service 320 may compare the size of the most recent snapshot to the size of the encrypted data, while accounting for changes in file size due to encryption. Mitigation service 320 may also identify other parameters (e.g., sensitivity, criticality, and classification) to calculate the cost of the lost data, as explained further in the description of process 400 below.

Calculation engine 325 is representative of any hardware, software, and/or firmware components capable of calculating the data loss metrics lost based on inputs received from mitigation service 320. In some implementations, calculation engine 325 may be algorithmic, using predefined formulas and rules to estimate the cost of the lost data. For example, the algorithm to calculate the value of the lost data may be represented by the following function:

$$\text{Cost of the data} = \sum f(\text{Data Classification, Sensitivity, Criticality, Amount}) \qquad \text{Function 1}$$

The above equation demonstrates that the cost of the data may be a function of four parameters (classification, sensitivity, criticality, and amount of lost data). The function $f$ may represent various algorithms utilized to calculate the cost in various implementations. Organizations have the flexibility to adjust the function and the weight of the parameters based on the type of business and its specific needs. For example, a healthcare provider might place greater emphasis on the sensitivity and criticality of patient records, while a financial institution may prioritize the classification and amount of transaction data. This adaptability allows each organization to tailor the cost calculation to reflect the unique value and risk associated with their specific data assets. It is noted that multiple different datasets with different parameters may be subject to a cyberattack. In an implementation, calculation engine 325 may determine the amount or volume of data by data class and apply a weighting which reflects the value of the data to each class of the lost data according to the criticality and/or sensitivity of each class. The values determined for each data class are then summed to determine a total cost of the data loss due to the cyberattack. The weighting may be, for example, a cost per gigabyte (or other quantity reflecting the amount of data). For the sake of illustration, if a cyberattack results in the loss of 200 Gb of highly valuable data (e.g., high criticality and high sensitivity) and 200 Gb of less valuable data (less critical and/or less sensitive), the relative cost of the lost data may be $8 k/Gb and $2 k/Gb, respectively, generating a final value of the loss of $2M. Accordingly, calculation engine 325 may calculate the cost of data loss for each affected data set using the function $f$, then sum the individual calculated costs (represented by "$\Sigma$") to arrive at the total cost.

In other implementations, calculation engine 325 may utilize advanced techniques such as a machine learning model to dynamically assess and predict the cost based on historical data and contextual factors. For example, calculation engine 325 may include an artificial neural network model trained to generate a cost projection for a data loss due to a cyberattack or other data loss event. In operation, data infrastructure service 305 may generate a feature or input vector (i.e., a data structure comprising data values organized in an array, the values of which are accessible by an index corresponding to each position in the array) based on the classification, sensitivity, criticality, and data volume parameters, for submission to the artificial neural network model. Such information may be obtained from a forensic analysis or projection generated by mitigation service 320. The artificial neural network model outputs a cost of the data loss in accordance with its training. The neural network may be trained using training and testing data comprising historical data from other data breaches including metrics describing the lost data (e.g., the parameters described above) along with insurance premium and/or payout data relating to such events. Calculation engine 325 may be separate from mitigation service 320 or integrated as a part of mitigation service 320 in various implementations.

Service provider 390 is a company or organization that provides mitigation services to enterprises for losses related to cyberattacks, including data breaches and data loss incidents. Service provider 390 may be a cyber-insurance provider that compensates for data loss incidents in an implementation. In another implementation, service provider 390 may be a reporting service that performs regulatory reporting functions for enterprises that experience data loss incidents. In yet another implementation, service provider 390 may be a cybersecurity consultancy that assists enterprises in strengthening their security posture.

Figure 4:
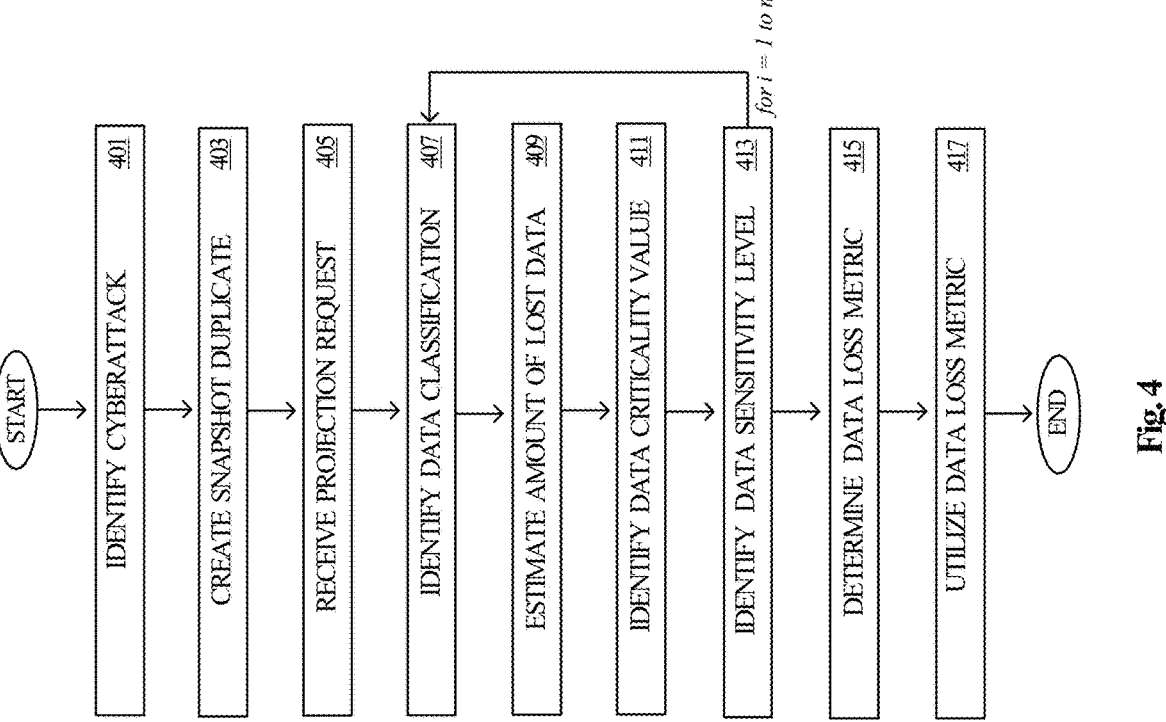
FIG. 4 illustrates a cyber-insurance claim process in an implementation.
Figure 4:

FIG. 4 illustrates a process for building cyber-insurance claims performed by integrated data services 110 (or, more specifically, by mitigation service 120 and recovery service 130), represented by process 400. Process 400 is employed by a computing device, an example of which is provided by computing system 801 of FIG. 8. Process 400 may be implemented in program instructions (software and/or firmware) by one or more processors of the computing device. The program instructions direct the computing device to operate as follows, referring parenthetically to the steps in FIG. 4.

In process 400, recovery service 330 identifies a cyberattack (step 401). The identification process involves monitoring the data volume 340 for unusual activity or known indicators of compromise, such as unauthorized access attempts, rapid encryption of files, or anomalies in data usage patterns. Once an attack is detected, recovery service 330 may restore data volume 340 with the most recent snapshot from snapshot storage 350.

Mitigation service 320 creates snapshot duplicate 355 and stores it in a separate data store (step 403). The snapshot duplicate 355 may be a copy of the most recent uncorrupted snapshot retrieved from snapshot storage 350. Snapshot duplicate 355 may be later accessed by mitigation service 320 to determine the amount of lost data. Storing duplicates in a separate data store ensures that the snapshots remain constant and unaltered, despite any ongoing changes in snapshot storage 350, providing verifiable evidence of the data state before and after the attack. A client may configure the duration that snapshot duplicate 355 is stored in the separate data store in some implementations. The client may configure the duration to accommodate any subsequent analysis that must be performed on the infiltrated dataset, such as for compliance with an insurance provider. The client may also configure a number of snapshot duplicates to be stored in the separate data store in some implementations. This may allow the client, for example, to store a sequence of snapshots that may be related to the infiltrated data.

Mitigation service 320 receives a projection request from a user (step 405). Mitigation service 320 may receive the request, for example, via a user interface on user device 360. The projection request may be, for example, a request to determine an amount of lost data, or a cost of the lost data (e.g., to build an insurance claim, according to some implementations).

Mitigation service 320 identifies one or more data classifications for the lost data (step 407). In one implementation, identifying the classifications may include performing a semantic analysis on snapshot duplicate 355 to determine the nature of the data. This analysis can categorize the data into various classifications such as financial data, customer information, intellectual property, or operational records. For example, financial data may include transaction records and budget reports, while customer information could encompass personal details and purchase histories. In another implementation, the data in data volume 340 may already be pre-classified within the enterprise's systems, allowing mitigation service 320 to retrieve and apply these existing classifications. In yet another implementation, the user building the claim may manually enter the classification of the lost data (as demonstrated in user interface 710 of FIG. 7A), selecting the appropriate category based on their knowledge and understanding of the data's content and purpose.

Step 407 may include identifying multiple different classifications for lost data (for example, where multiple different datasets having different classifications were lost due to the cyberattack). Where multiple classifications are identified, steps 407-413 are carried out iteratively for "i=1 to n" times, where n represents the number of identified classifications. For example, where five classifications are identified, steps 407-413 are performed iteratively five times. Accordingly, the amount of lost data, the sensitivity level of the lost data, and the criticality value are calculated separately for each classification identified, as explained further below.

Mitigation service 320 estimates the amount of the lost data (step 409). The amount of lost data may be specific to one of the identified classifications from step 407 in each iteration. To estimate the amount of lost data, mitigation service 320 may examine the timestamps of data added or altered in the most recent snapshot. Snapshots may capture the state of the data at specific points in time, including the timestamps of the last modifications made to each piece of data. By reviewing these timestamps, mitigation service 320 can determine the frequency and volume of data changes, and thereby estimating the amount of data lost during the period between the last snapshot and the cyberattack. In another implementation, mitigation service may use multiple successive snapshots to average the amount of data added or modified in data volume 340 over time. Using this average amount, mitigation service 320 may estimate the amount of data lost in the period between the last snapshot and the cyberattack.

Mitigation service 320 identifies a data criticality value of the lost data (step 411). The data criticality value may be specific to one of the identified classifications from step 407 in each iteration. Identifying the criticality can include reviewing usage metrics of data volume 340 to determine how important the data is to the enterprise's operations. Usage metrics may involve analyzing how frequently the data is accessed, the number of systems and processes that rely on the data, and the role the data plays in critical business functions. In other implementations, the criticality of the data can be entered by the user building a claim, as demonstrated in user interface 700 of FIG. 7A. For instance, the user might assign a criticality value from 1 to 5, where 1 represents low criticality and 5 represents high criticality. This user input allows for a tailored assessment based on the specific context and knowledge of the data's significance to the organization.

Mitigation service 320 identifies a data sensitivity level of the lost data (step 413). The data sensitivity level may be specific to one of the identified classifications from step 407 in each iteration. In one implementation, the system may perform an analysis on snapshot duplicate 355 to ascertain the sensitivity level, such as identifying personally identifiable information (PII), confidential business information, or regulatory compliance data. Examples include social security numbers, trade secrets, and medical records. In another implementation, the data may be pre-labeled with sensitivity levels within the enterprise's data management systems, which mitigation service 320 can access and use for the claim. In yet another implementation, the user building the claim may manually enter the sensitivity of the lost data (as demonstrated in user interface 700 of FIG. 7A), assigning it a category based on predefined sensitivity levels such as low, medium, or high, reflecting the data's potential impact if compromised.

Mitigation service 320 calculates a data loss metric (step 415). The data loss metric may include calculating the cost of the lost data in some implementations. Step 415 may include providing an input to calculation engine 325 and receiving the cost of the lost data as the output value, where the input includes the identified parameters in each iteration of steps 407 to 413. In some implementations, calculation engine 325 may utilize algorithmic methods (such as "Function 1" set forth above), applying predefined formulas and rules to estimate the financial impact of the lost data. Calculation engine 325 may apply weightings that reflect the value of datasets having various classifications, sensitivity levels, and criticality values. For example, a dataset with a high criticality level is of greater importance to an enterprise than a dataset with a low criticality level; accordingly, calculation engine 325 may calculate a higher cost for a dataset with a high criticality level as compared to a dataset with a low criticality level. In other implementations, calculation engine 325 may be an artificial intelligence model trained to calculate the cost based on the input parameters.

Mitigation service 320 utilizes the data loss metric (step 417). Utilizing the data loss metric may include, for example, submitting a cyber-insurance claim to service provider 390 with the calculated cost from step 415.

Figure 5:
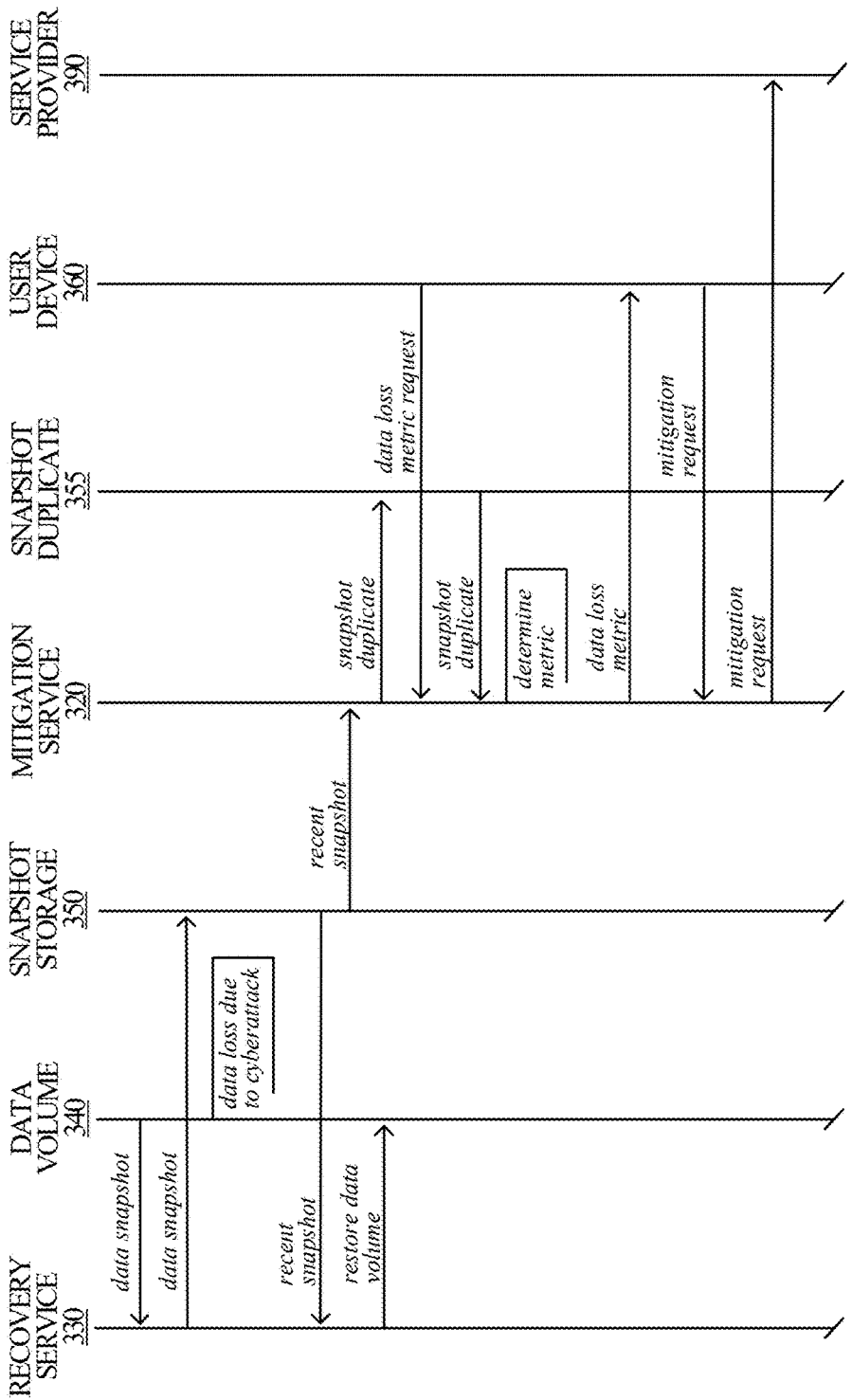
FIG. 5 illustrates an operational sequence in an implementation.

FIG. 5 illustrates an operational scenario of an application of process 400 in the context of data environment 300 in an implementation, represented by scenario 500. Scenario 500 includes recovery service 330, data volume 340, snapshot storage 350, mitigation service 320, snapshot duplicate 355, user device 360, and service provider 390.

To begin, recovery service 330 takes a snapshot of data volume 340 and stores the snapshot in snapshot storage 350. Next, data volume 340 suffers a loss of data due to a cyberattack. The cyberattack may be identified by recovery service, as discussed in step 401 of process 400. In response, recovery service 330 retrieves the most recent uncorrupted snapshot from snapshot storage and restores the data volume 340 with the snapshot, thereby minimizing downtime and data loss.

In parallel with the data restoration performed by recovery service 330, mitigation service 320 retrieves the most recent snapshot from snapshot storage 350 and creates snapshot duplicate 355 (as discussed above in step 403 of process 400). This duplicate is stored in a separate data store to ensure it remains unchanged, even if the original snapshot storage continues to be modified. As discussed above in step 403 of process 400, the duration and number of duplicates is configurable by the client. Mitigation service 320 receives a data loss metric request from user device 360, which may be submitted for example, by an administrator of the enterprise that owns data volume 340. The data loss metric request may be, for example, a request to determine the cost of the lost data.

Mitigation service 320 utilizes the snapshot duplicate 355 to calculate the data loss metric (e.g., a cost of the lost data), as discussed in step 415 of process 400. Mitigation service 320 receives a mitigation request from user device 360. The mitigation request may be, for example, a request to submit an insurance claim to service provider 390. Mitigation service 320 forwards the mitigation request to service provider 390.

Operational scenario 500 demonstrates that, even if the user submits the claim-building request long after the cyberattack, snapshot duplicate 370 remains preserved and unchanged, providing a reliable record for accurately assessing the data loss.

Figure 6:
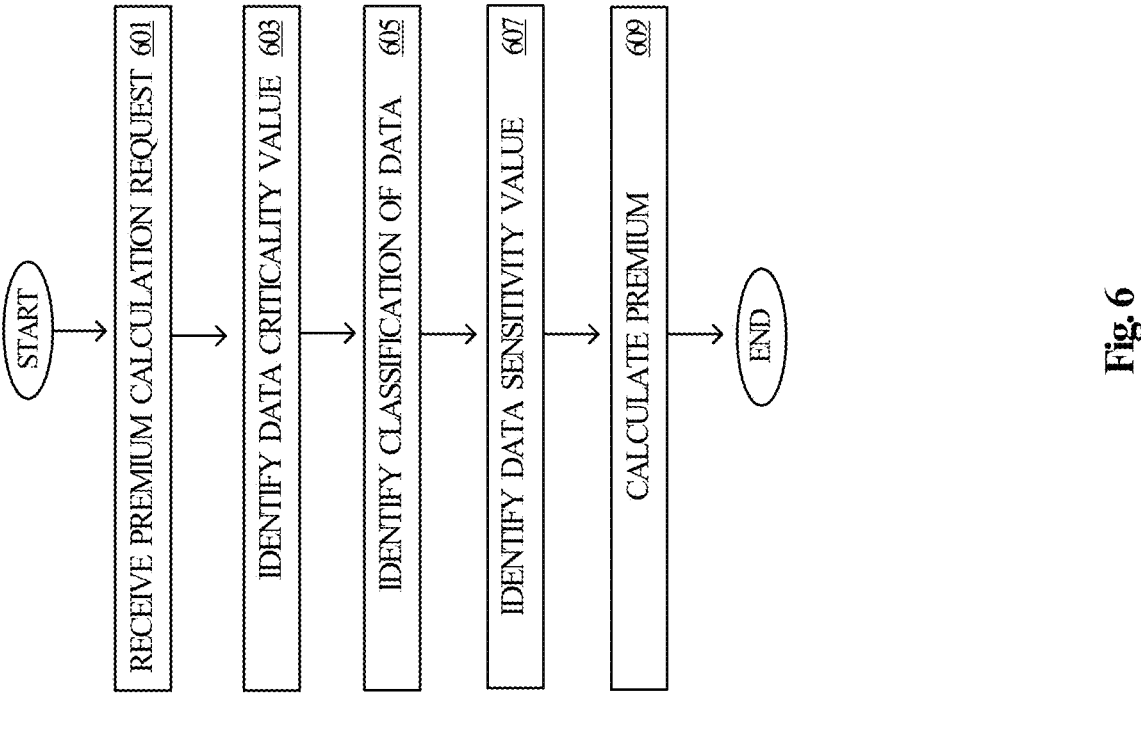
FIG. 6 illustrates a premium calculation process in an implementation.

FIG. 6 illustrates a process for building cyber-insurance claims, performed by integrated data services 310 (and more specifically by mitigation service 320), represented by process 600. Process 600 is employed by a computing device, an example of which is provided by computing system 801 of FIG. 8. Process 600 may be implemented in program instructions (software and/or firmware) by one or more processors of the computing device. The program instructions direct the computing device to operate as follows, referring parenthetically to the steps in FIG. 6.

To begin, mitigation service 320 receives a premium calculation request (step 601). This request may originate from an administrator of an enterprise system on user device 360. In another implementation, a premium calculation request may be received from insurance companies to determine the appropriate cyber-insurance premium. Upon receiving the request, mitigation service 320 initiates the process of evaluating the data in data volume 340 to determine the appropriate insurance premium.

Mitigation service 320 identifies a criticality of the data in data volume 340 (step 603). Identifying the criticality may be based on usage statistics of data volume 340. Usage statistics may involve analyzing how frequently the data is accessed, the number of systems and processes that rely on the data, and the role the data plays in critical business functions. In other implementations, the criticality of the data can be entered by the user building a claim. For instance, the user might assign a criticality value from 1 to 5, where 1 represents low criticality and 5 represents high criticality. This user input allows for a tailored assessment based on the specific context and knowledge of the data's significance to the organization.

Mitigation service 320 identifies a classification of the data in the data volume (step 605). In one implementation, identifying the classification may include performing a semantic analysis on data volume 340 to determine the nature of the data. This analysis can categorize the data into various classifications such as financial data, customer information, intellectual property, or operational records. For example, financial data may include transaction records and budget reports, while customer information could encompass personal details and purchase histories.

Mitigation service 320 identifies a sensitivity of the data in the data volume (step 607). In one implementation, the system may perform an analysis on data volume 340 to ascertain the sensitivity level, such as identifying personally identifiable information (PII), confidential business information, or regulatory compliance data. Examples include social security numbers, trade secrets, and medical records. In some implementations, the client may create custom sensitivity classifications which are tailored to their specific operational needs.

Mitigation service 320 calculates an insurance premium. (Step 609). Mitigation service 320 may calculate the premium based on the identified criticality, classification, and sensitivity in some implementation. Calculating the premium may include providing an input to calculation engine 325 and receiving a recommended premium value of the lost data as the output, where the input includes numerical representations of the identified parameters (i.e., the criticality, the sensitivity, and the classification). In some implementations, calculation engine 325 may utilize algorithmic methods, applying predefined formulas and rules to estimate a reasonable premium. In other implementations, calculation engine 325 may be an artificial intelligence model trained to calculate the cost based on the input parameters.

By assessing the parameters using data volume 340, mitigation service 320, in conjunction with the calculation engine 325, can accurately determine the financial impact of data loss due to cyberattacks. This approach enables enterprises and insurance companies to establish fair and precise insurance premiums, ensuring that the value of digital assets is adequately protected.

Figure 7A:
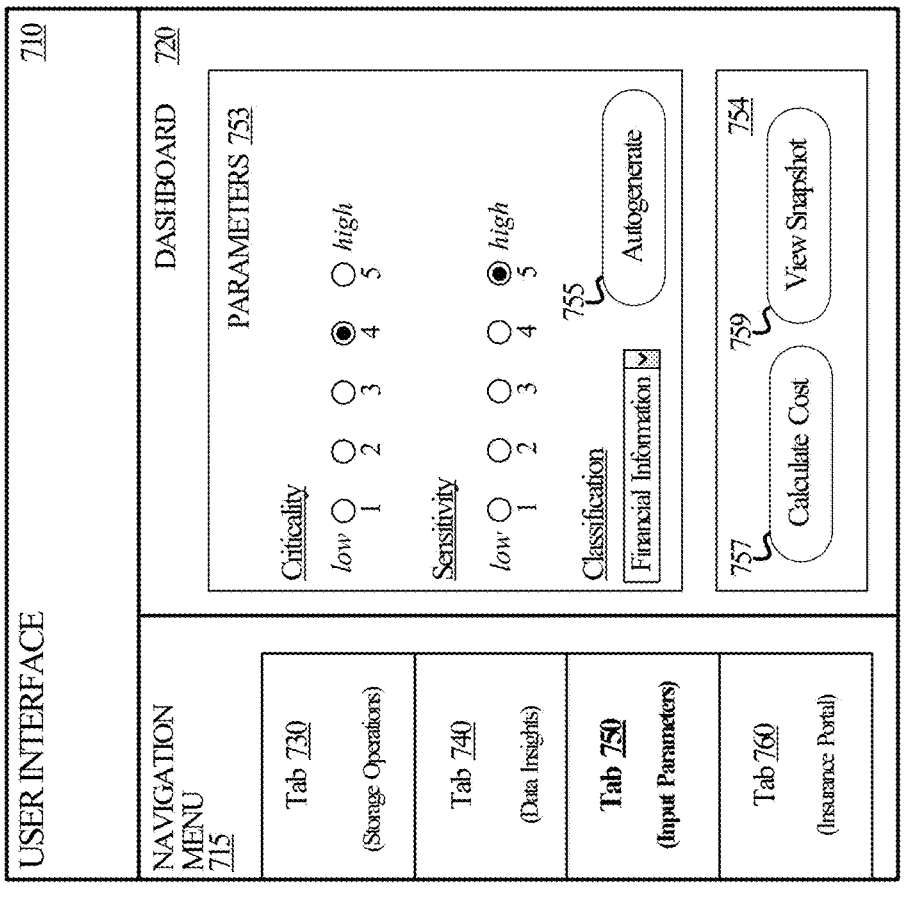
FIGS. 7A and 7B illustrate a user interface in an implementation.

FIG. 7A illustrates an exemplary user interface 710, which may be viewed by a user on a user device, such as user device 360 of FIG. 3. User interface 710 includes navigation menu 715 and dashboard 720.

Navigation menu 715 includes several tabs for accessing different functionalities of a data service, such as data infrastructure service 305 of FIG. 3. Tab 730, labeled "Storage Operations," allows users to manage and monitor storage-related operations, such as viewing current storage usage, configuring storage settings, and managing snapshots. Tab 740, labeled "Data Insights," provides access to data analytics and insights, enabling users to view reports, analyze data trends, and generate insights based on the stored data. Tab 750, labeled "Input Parameters," is focused on inputting various parameters required for insurance claim calculations and is highlighted in FIG. 7A, indicating that it is the currently selected tab. Tab 760, labeled "Insurance Portal," serves as the entry point to the insurance portal, where users can submit claims, view claim status, and manage insurance policies.

Dashboard 720 is the main working area where users may interact with the data service. Dashboard 720 in FIG. 7A shows a display provided to the user upon selection of the "Input Parameters" tab 750 of navigation menu 715. In pane 753, a user may select parameters (e.g., criticality, sensitivity, and classification) for the calculation of the cost of lost data due to a cyberattack. The user may select a value from 1 to 5 for the criticality of the lost data, where 1 is the lowest criticality (which may be appropriate, for example, archived records) and 5 is the highest criticality (which may be appropriate, for example, for actively utilized customer information). The user may also select a value from 1 to 5 for the sensitivity of the lost data, where 1 is the lowest sensitivity (which may be appropriate, for example, publicly available information) and 5 is the highest sensitivity (which may be appropriate, for example, for Personally Identifiable Information or confidential business information). It is noted that the scale from 1 to 5 for criticality and sensitivity is exemplary; other schemes for quantifying these metrics may be used in other implementations. The user may also select a classification of the lost data from a drop-down menu indicating various classifications for the data (e.g., "Financial Information," "Customer Information," "Employee Documents," "Intellectual Property," etc.). In the example in FIG. 7A, the user has selected "Financial Information."

Pane 753 also includes "Autogenerate" element 755, which a user may select to automatically generate the criticality, sensitivity, and classification of the lost data. Insurance management service 320, may, upon receiving the selection of button 755, utilize snapshot duplicate 355 to generate the parameters. Once the user arrives at the appropriate parameters (either by inputting them or by requesting an auto generation), the user may request to calculate the cost of the lost data by selecting "Calculate Cost" element 757 of pane 754. A selection of element 757 may be the projection request discussed above in step 405 of process 400.

Pane 754 also includes a "View Snapshot" element 759, which allows users to view details of the snapshot (e.g., snapshot duplicate 355 of FIG. 3) when determining the appropriate parameter values. Upon receiving the selection of element 759, mitigation service 320 may retrieve and display detailed information about snapshot duplicate 355. This information may include metadata such as the timestamp of the snapshot, the size of the data captured, and a summary of the data contents.

Figure 7B:
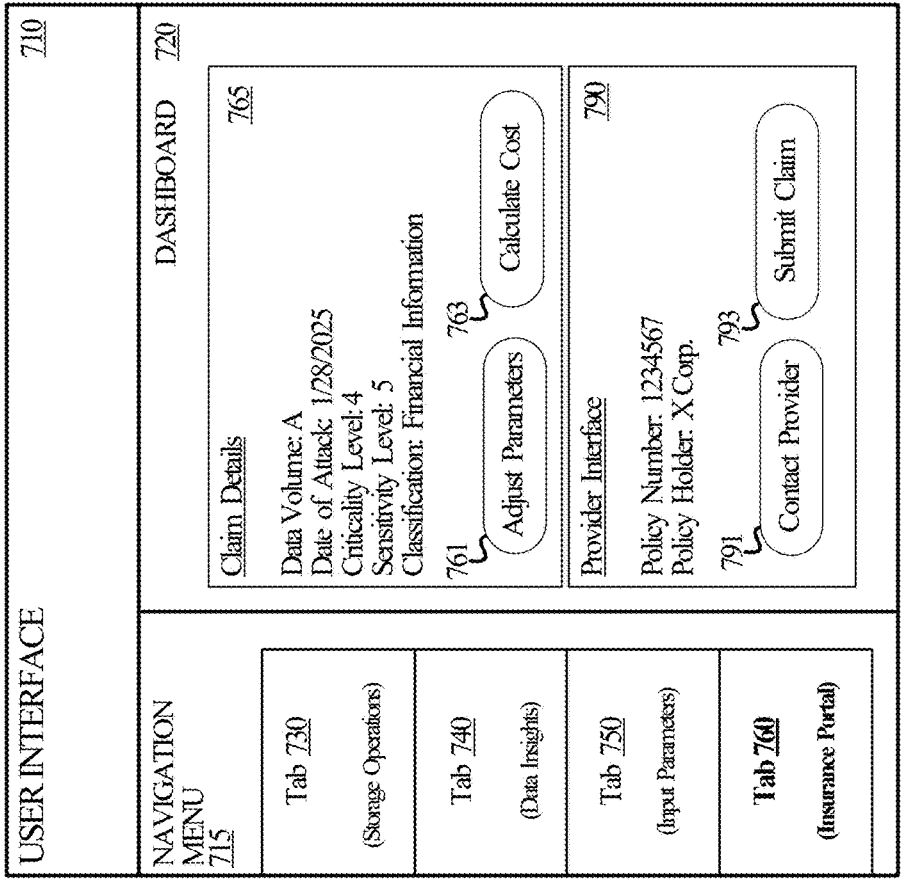

FIG. 7B the user interface 710, which may be the same user interface described in FIG. 7A, except that in FIG. 7B, the user has selected the "Insurance Portal" tab 760 from navigation menu 715.

Pane 765 displays information related to the insurance claim. This includes the specific data volume affected ("Data Volume: A"), the date when the cyberattack occurred, ("Jan. 28, 2025"), the criticality of the lost data, the sensitivity of the lost data, and the classification of the lost data. Pane 765 also includes "Adjust Parameters" element 761. When element 761 is selected, mitigation service 320 may display a user interface for adjusting values such as criticality, sensitivity, and classification (as shown for example in FIG. 7A). Pane 765 also includes "Calculate Cost" element 763. A selection of element 763 may be the projection described above in the discussion of step 405 of process 400.

Pane 790 provides an interface for interacting with the cyber-insurance provider (such as service provider 390 of FIG. 3). Pane 790 includes a listing of the policy number ("1234567") and the policy holder (X Corp.). Pane 790 includes "Contact Provider" element 791 which a user may select to initiate contact with the insurance provider for inquiries or further actions regarding the claim. Pane 790 also includes "Submit Claim" element 793, which a user may select to submit a completed insurance claim for the data lost in the cyberattack.

FIG. 8 illustrates computing system 801, which is representative of any system or collection of systems in which the various applications, processes, services, and scenarios disclosed herein may be implemented. Examples of computing system 801 include, but are not limited to server computers, web servers, cloud computing platforms, and data center equipment, as well as any other type of physical or virtual server machine, container, and any variation or combination thereof. (In some examples, computing system 801 may also be representative of desktop and laptop computers, tablet computers, and the like.)

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes and implements cyber-insurance management process 806, which is representative of the processes discussed with respect to the preceding Figures, such as processes 200, 400, and 600. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may include a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, microcontroller units, graphical processing units, application specific processors, integrated circuits, application specific integrated circuits, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 803 may be implemented as a single storage device but may also be implemented across multiple storage devices or sub-systems co-located or distributed relative to each other. Storage system 803 may comprise additional elements, such as a controller capable of communicating with processing system 802 or possibly other systems.

Software 805 (including cyber-insurance management processes 806) may be implemented in program instructions and among other functions may, when executed by processing system 802, direct processing system 802 to operate as described with respect to the various operational scenarios, sequences, and processes illustrated herein. For example, software 805 may include program instructions for implementing cyber-insurance management processes and procedures as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method for developing forensic projections based on snapshots comprising:
  identifying a snapshot of a portion of a data volume affected by a cyberattack, wherein the snapshot comprises information indicative of changes made to the portion of the data volume between the snapshot and the cyberattack, and wherein the snapshot is a most recent snapshot of a plurality of snapshots taken before the cyberattack:
  determining a forensic projection associated with the portion of the data volume based on the information of the snapshot, wherein the determining the forensic projection comprises estimating an amount of lost data between the most recent snapshot and the cyberattack; and
  determining a data loss metric based on the forensic projection.

2. The computer-implemented method of claim 1 wherein the estimating the amount of lost data comprises:
  calculating, based on the most recent snapshot, an average amount of data added to the portion of the data volume over time; and
  estimating the amount of lost data based on the average amount and an amount of time between the most recent snapshot and the cyberattack.

3. The computer-implemented method of claim 1 wherein:
  the determining the forensic projection further comprises:

identifying one or more data classifications associated with the most recent snapshot,
  identifying one or more data sensitivity metrics associated with the most recent snapshot, and
  identifying one or more data criticality metrics associated with the most recent snapshot; and
  the determining the data loss metric comprises calculating a cost of the lost data based on the amount of the lost data, the one or more data classifications, the one or more data sensitivity metrics, and the one or more data criticality metrics.

4. The computer-implemented method of claim 3 wherein the calculating the cost of the lost data further comprises:
  submitting an input to a machine learning model, the input comprising the amount of the lost data, the one or more data classifications, the one or more data sensitivity metrics, and the one or more data criticality metrics; and
  receiving, from the machine learning model in response to the input, an output comprising the cost of the lost data.

5. The computer-implemented method of claim 3 further comprising:
  storing, in response the cyberattack, a duplicate of the snapshot in a separate data store; and
  receiving, via a user interface, a mitigation request from a user, wherein the calculating the cost of the lost data is performed using the duplicate of the snapshot in response to the mitigation request.

6. The computer-implemented method of claim 3, wherein:
  the identifying the one or more data classifications comprises receiving, via a user interface a first user selection of the one or more data classifications;
  the identifying the one or more data sensitivity metrics comprises receiving, via the user interface, a second user selection of the one or more data sensitivity metrics; and
  the identifying the one or more data criticality metrics comprises receiving, via the user interface, a third user selection of the one or more data criticality metrics.

7. A system for developing forensic projections from snapshots, the system comprising:
  one or more processors; and
  one or more memories operably coupled to the one or more processors and having stored thereon software instructions that, upon execution by the one or more processors, cause the one or more processors to:
    identify a snapshot of a portion of a data volume affected by a cyberattack, wherein the snapshot comprises information indicative of changes made to the portion of the data volume between the snapshot and the cyberattack, and wherein the snapshot is a most recent snapshot of a plurality of snapshots taken before the cyberattack:
    determine a forensic projection associated with the portion of the data volume based on the information of the snapshot, wherein the determining the forensic projection comprises estimating an amount of lost data between the most recent snapshot and the cyberattack; and
    determine a data loss metric based on the forensic projection.

8. The system of claim 7 wherein the estimating the amount of lost data comprises:
  calculating, based on the most recent snapshot, an average amount of data added to the portion of the data volume over time; and estimating the amount of lost data based on the average amount and an amount of time between the most recent snapshot and the cyberattack.

9. The system of claim 7, wherein:

the determining the forensic projection further comprises:
identifying one or more data classifications associated with the most recent snapshot,
identifying one or more data sensitivity metrics associated with the most recent snapshot, and
identifying one or more data criticality metrics associated with the most recent snapshot; and
the determining the data loss metric comprises calculating a cost of the lost data based on the amount of the lost data, the one or more data classifications, the one or more data sensitivity metrics, and the one or more data criticality metrics.

10. The system of claim 9 wherein the calculating the cost of the lost data further comprises:

submitting an input to a machine learning model, the input comprising the amount of the lost data, the one or more data classifications, the one or more data sensitivity metrics, and the one or more data criticality metrics; and
receiving, from the machine learning model in response to the input, an output comprising the cost of the lost data.

11. The system of claim 9 wherein the software instructions comprise further instructions that, upon execution by the one or more processors, cause the one or more processors to:

store, in response the cyberattack, a duplicate of the snapshot in a separate data store; and
receive, via a user interface, a mitigation request from a user, wherein the calculating the cost of the lost data is performed using the duplicate of the snapshot in response to the mitigation request.

12. The system of claim 9, wherein:

the identifying the one or more data classifications comprises receiving, via a user interface a first user selection of the one or more data classifications;
the identifying the one or more data sensitivity metrics comprises receiving, via the user interface, a second user selection of the one or more data sensitivity metrics; and
the identifying the one or more data criticality metrics comprises receiving, via the user interface, a third user selection of the one or more data criticality metrics.

13. A computer-readable storage media having program instructions stored thereon to develop forensic projections from snapshots, wherein the program instructions, upon execution by one or more processors, cause the one or more processors to:

identify a snapshot of a portion of a data volume affected by a cyberattack, wherein the snapshot comprises information indicative of changes made to the portion of the data volume between the snapshot and the cyberattack, and wherein the snapshot is a most recent snapshot of a plurality of snapshots taken before the cyberattack;
determine a forensic projection associated with the portion of the data volume based on the information of the snapshot, wherein the determining the forensic projection comprises estimating an amount of lost data between the most recent snapshot and the cyberattack; and
determine a data loss metric based on the forensic projection.

14. The computer-readable storage media of claim 13 wherein the estimating the amount of lost data comprises:

calculating, based on the most recent snapshot, an average amount of data added to the portion of the data volume over time; and
estimating the amount of lost data based on the average amount and an amount of time between the most recent snapshot and the cyberattack.

15. The computer-readable storage media of claim 13 wherein:

the determining the forensic projection further comprises:
identifying one or more data classifications associated with the most recent snapshot,
identifying one or more data sensitivity metrics associated with the most recent snapshot, and
identifying one or more data criticality metrics associated with the most recent snapshot; and
the determining the data loss metric comprises calculating a cost of the lost data based on the amount of the lost data, the one or more data classifications, the one or more data sensitivity metrics, and the one or more data criticality metrics.

16. The computer-readable storage media of claim 15 wherein the calculating the cost of the lost data further comprises:

submitting an input to a machine learning model, the input comprising the amount of the lost data, the one or more data classifications, the one or more data sensitivity metrics, and the one or more data criticality metrics; and
receiving, from the machine learning model in response to the input, an output comprising the cost of the lost data.

17. The computer-readable storage media of claim 15 wherein the program instructions further cause the one or more processors to:

store, in response the cyberattack, a duplicate of the snapshot in a separate data store; and
receive, via a user interface, a mitigation request from a user, wherein the calculating the cost of the lost data is performed using the duplicate of the snapshot in response to the mitigation request.

\* \* \* \* \*